United States Patent [19]

Paule et al.

[11] 4,057,113

[45] Nov. 8, 1977

[54] PNEUMATICALLY POWERED HAND TOOL WITH SPEED-CONTROL GOVERNOR

[75] Inventors: Kurt Paule, Stuttgart; Karl Roll, Leinfelden; Max Bürklin, Waldenbugh, all of Germany

[73] Assignee: Robert Bosch GmbH, Stuttgart, Germany

[21] Appl. No.: 711,411

[22] Filed: Aug. 3, 1976

[30] Foreign Application Priority Data

Aug. 22, 1975 Germany ............................ 2537395

[51] Int. Cl.² .......................................... B23Q 5/027
[52] U.S. Cl. ...................................... 173/12; 137/53; 415/39; 415/44; 418/43
[58] Field of Search ..................... 91/59, 336; 137/49, 137/52-58; 173/12, 168, 169; 415/22, 25, 38, 44, 39; 418/40-44

[56] References Cited

U.S. PATENT DOCUMENTS

| 228,772 | 6/1880 | Michener | 137/49 |
|---|---|---|---|
| 270,546 | 1/1883 | Hunt | 137/49 |
| 1,009,213 | 11/1911 | Augustine | 418/43 |
| 2,903,003 | 9/1959 | Walton | 418/40 X |
| 3,697,189 | 10/1972 | Tibbott | 173/12 X |
| 3,740,174 | 6/1973 | Amtsberg | 418/43 |
| 3,785,442 | 1/1974 | Amtsberg et al. | 173/12 |
| 3,811,514 | 5/1974 | Blomberg et al. | 173/169 |
| 3,904,305 | 9/1975 | Boyd | 173/12 X |

FOREIGN PATENT DOCUMENTS 588,819 2/1925 France ................... 137/53

*Primary Examiner*—Lawrence J. Staab
*Attorney, Agent, or Firm*—Michael J. Striker

[57] ABSTRACT

A pneumatic hand tool comprises a housing having a compressed-gas inlet and provided with a pneumatically powered motor which carries on one side a tool holder such as a chuck and on the other side a governor. A speed-control valve is operated by the governor and can close a first air passage between the inlet and the motor to maintain the motor speed below a predetermined limit. Another passage is provided which bypasses the governor-controlled speed-control valve and a valve is provided in this bypass conduit which is openable in order to allow the hand tool to operate at a speed substantially above the governor-established speed.

10 Claims, 10 Drawing Figures

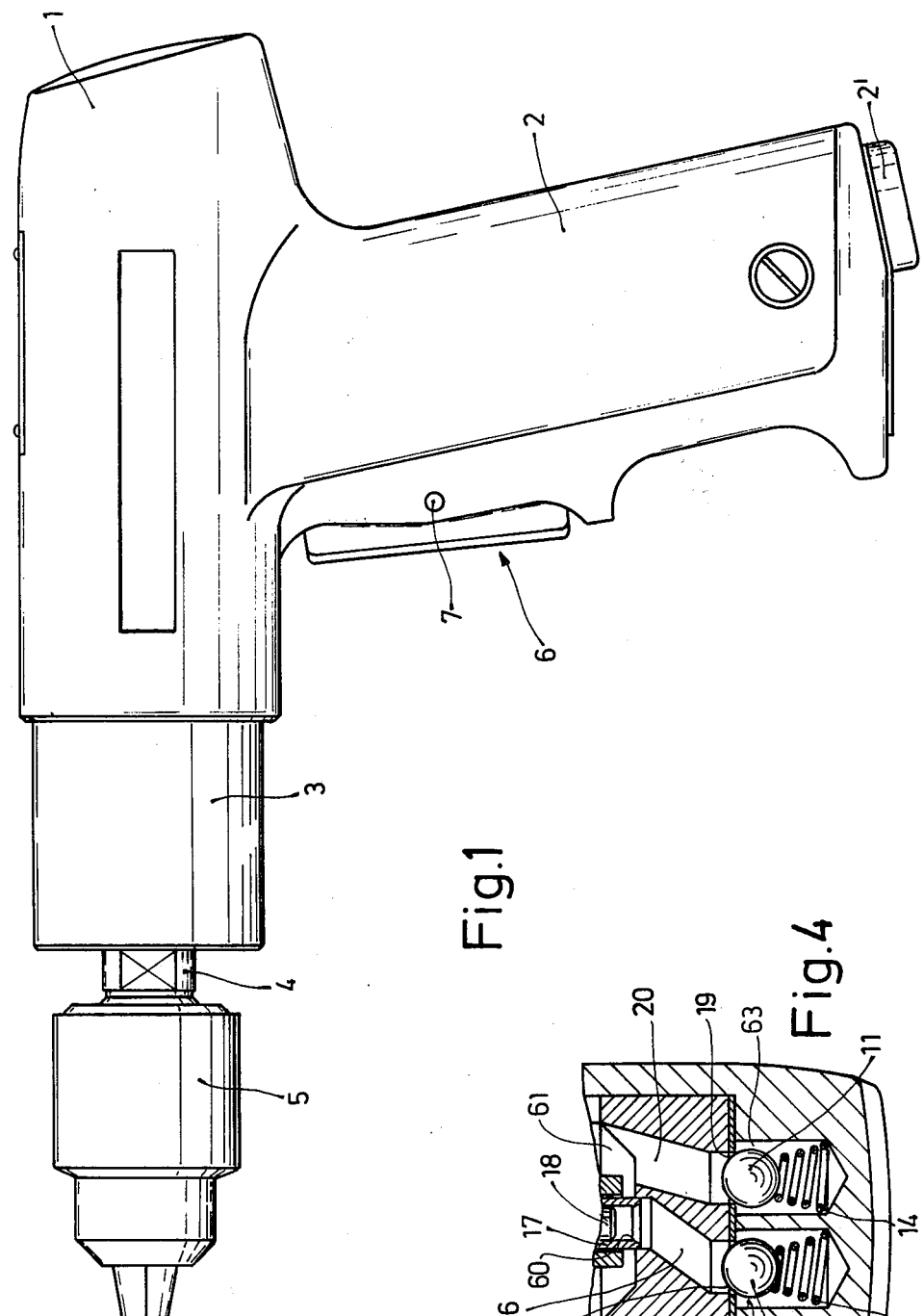

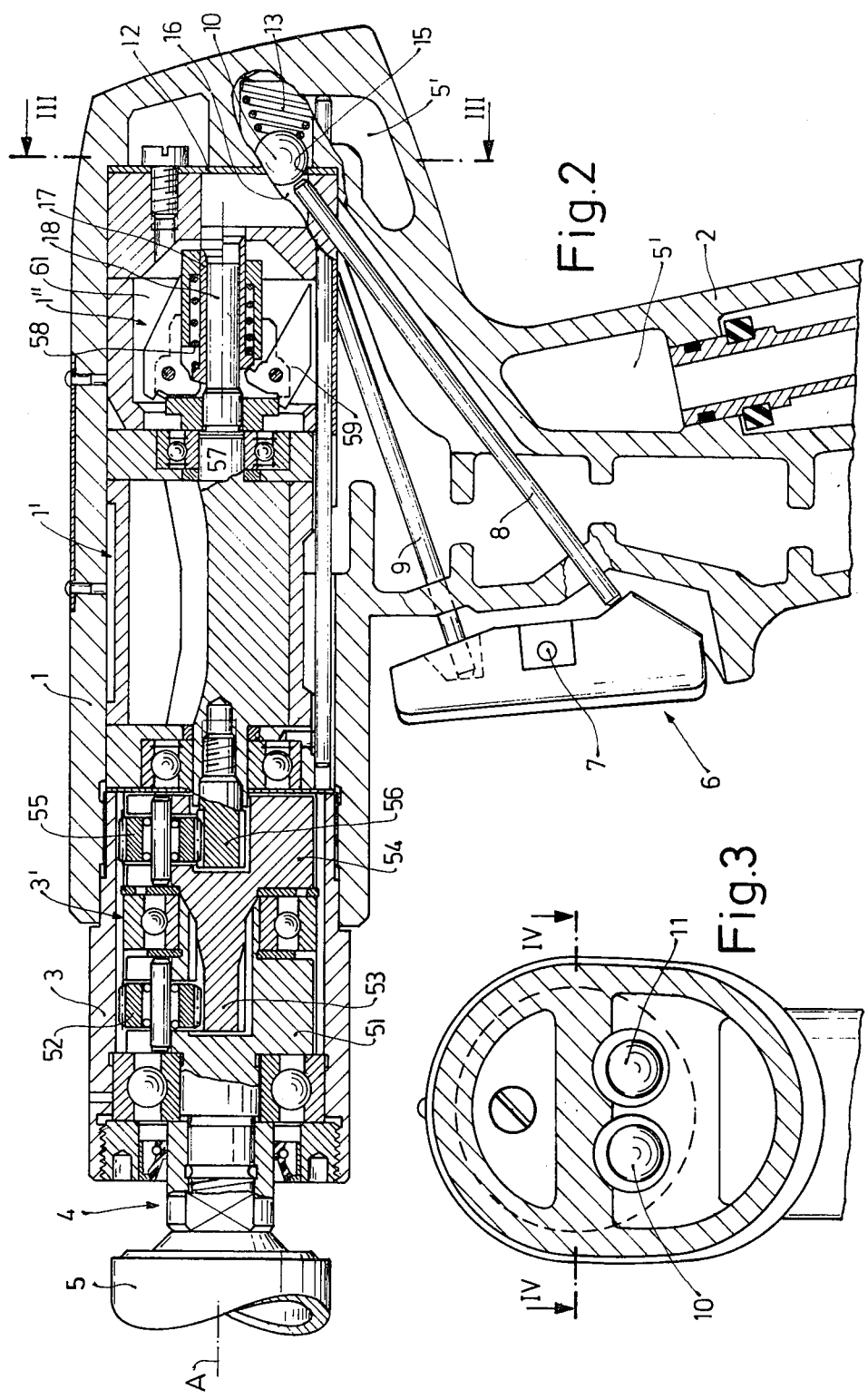

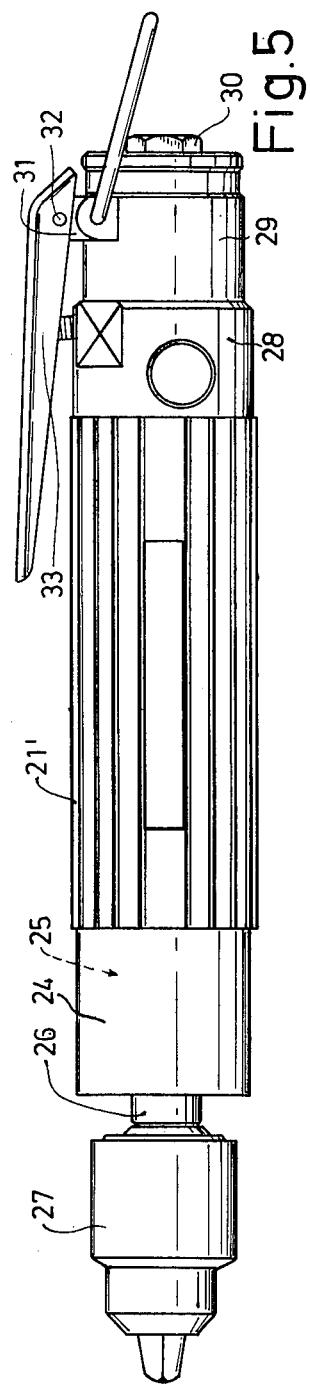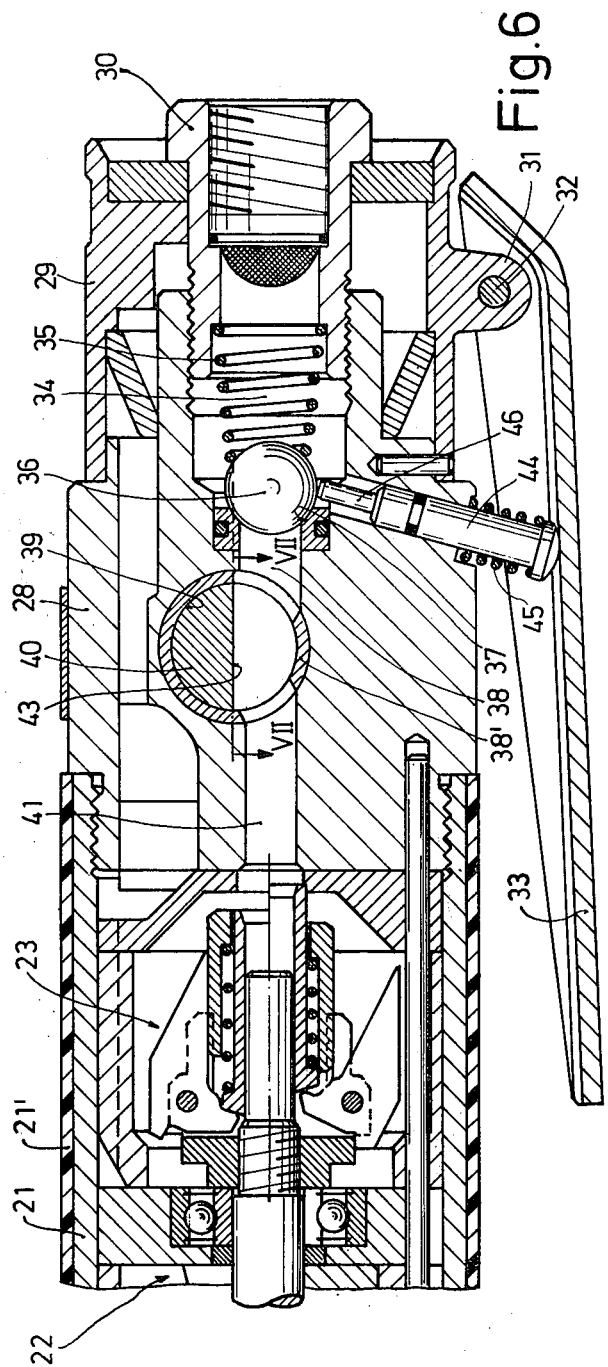

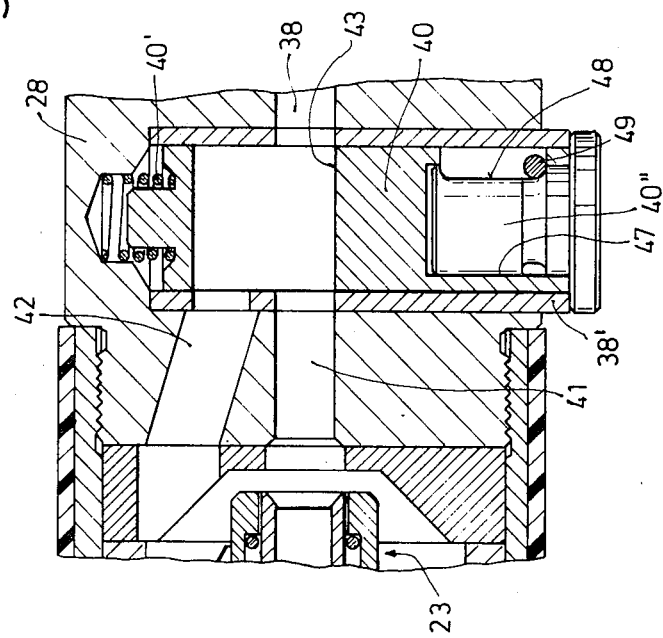
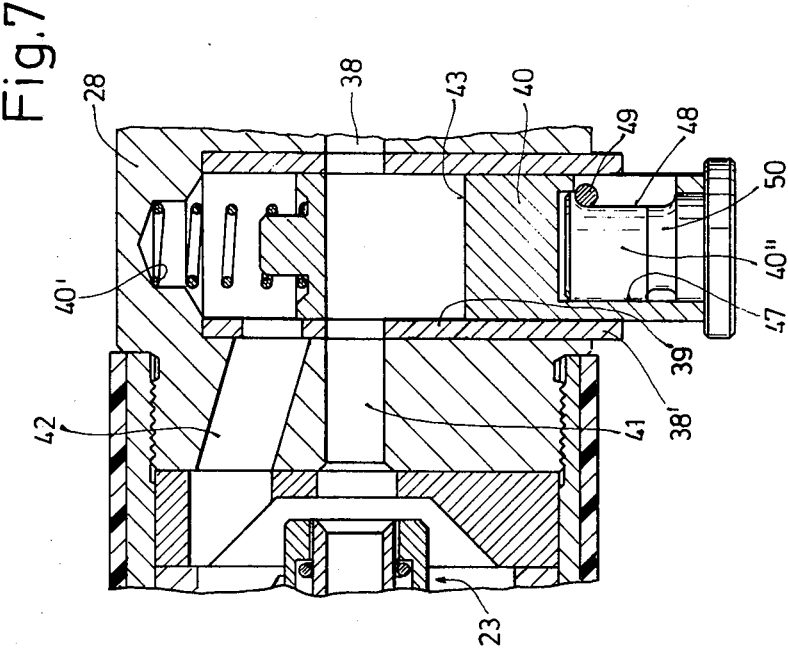

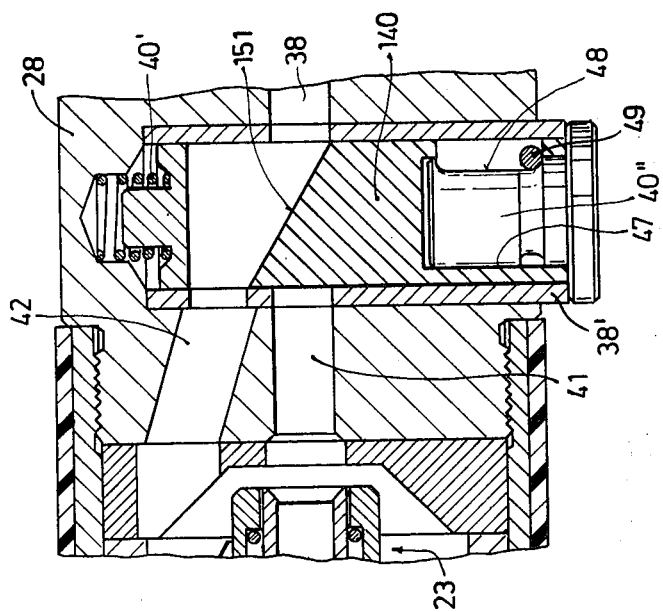
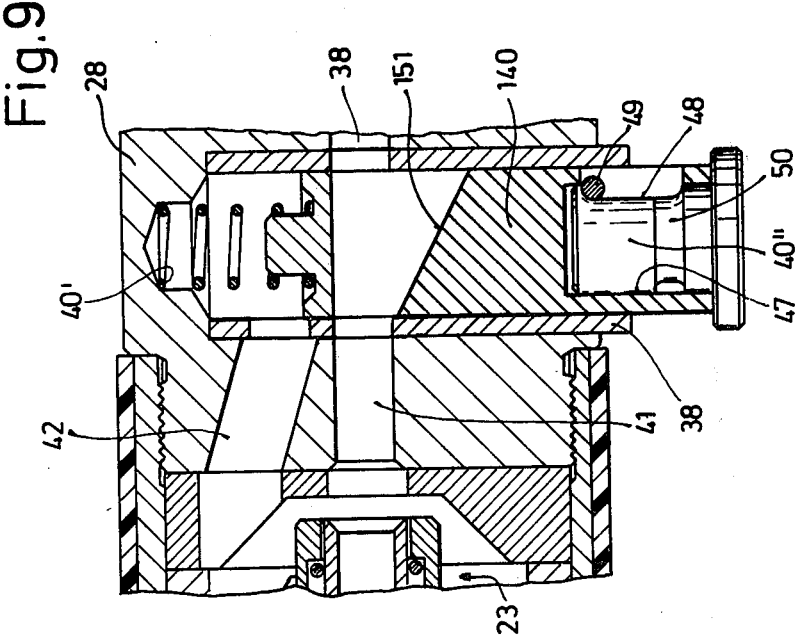

PNEUMATICALLY POWERED HAND TOOL WITH SPEED-CONTROL GOVERNOR

CROSS-REFERENCE TO RELATED APPLICATION

The present application is related to the copending and commonly assigned patent application Ser. No 653,253 whose entire disclosure is herewith incorporated by reference.

BACKGROUND OF THE INVENTION

The present invention relates to a pneumatic hand tool. More particularly this invention concerns a pneumatically powered drill.

A pneumatically powered hand tool is known provided internally with a pneumatically powered motor or turbine which is connected through a main control valve to a compressed gas inlet on the housing of the tool. This motor carries a tool holder which may be a chuck for drill bits, a mandrel holder for a grinding wheel, a screwdriver bit, or any of a multiplicity of tools. When the main control valve is opened the turbine is pressurized with compressed air and the tool holder is rotated and/or reciprocated.

In order to reduce the wear and initial heating-up in such tools it is known to provide a governor in the housing connected to the motor and operating a valve which reduces or completely cuts off the air supply to the motor when a predetermined speed is exceeded. Such an arrangement prevents the motor from running at extremely high speeds when unloaded, so that wear of the various bearings and waste of compressed gas is minimized.

The principal disadvantage of such a governor-controlled drill is that it is impossible to use it at very high speeds, for instance, when drilling with a small-diameter bit. Thus the provision of such a governor, although it considerably increases the service life of the tool, nevertheless makes the tool unsuitable for some relatively common operations.

SUMMARY OF THE INVENTION

It is therefore an object of the present invention to provide an improved pneumatically powered hand tool. Another object is the provision of such a tool which overcomes the above-given disadvantages.

These objects are attained according to the present invention in a pneumatic hand tool wherein there is provided a bypass valve and another gas passage which extends between the compressed inlet and the motor around the speed-control valve that is operated by the governor. When this bypass valve is opened, therefore, the governor is bypassed and the tool, which normally cannot operate above a predetermined maximum speed, can then be operated at a much higher speed.

According to another feature of this invention there is provided a normally closed slow valve in one passage that extends between the gas inlet and the speed-control valve of the governor. Both this slow valve and the bypass valve, which, therefore, functions as a fast valve, are of the normally closed ball type. A typical trigger on the drill housing is connected via a pair of push rods to this ball valves and can open either one or the other. Thus when not tipped at all the trigger will leave both of the valves closed so that the motor of the drill will not be operated at all. When tipped in one direction the bypass valve will be opened and the motor can operate at maximum speed, and when tipped in the other direction only the slow valve is opened so that the motor can only operate up to the speed set by the governor.

According to yet another feature of this invention there is provided a main valve between an inlet and both of the passages. This main valve is opened to start the drill and the bypass valve is operated to cut out the governor if desired. The bypass valve in this arrangement maybe slide valve movable between a slow position connecting the inlet exclusively with the one passage and a fast position connecting the inlet exclusively with the other passage. It is also possible to form the bypass valve with a slide valve movable between a slow position connecting it exclusively with the one passage and a fast position connecting the inlet with both of the passages.

In accordance with yet another feature of this invention a spring normally urges the bypass valve into a closed condition with gas flowing through the speed-control valve connected to the governor. Thus unless the bypass valve expressely actuated the governor will be effective.

According to a further feature of this invention means is provided for locking the bypass valve in an open condition. Thus the user can cut out the governor without having to keep his or her hand on the button or operating member for the bypass valve.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWINGS

FIG. 1 is a side elevational view of a first embodiment of a pneumatically powered hand tool in accordance with this invention;

FIG. 2 is a large-scale sectional view through the rear end of the tool shown in FIG. 1;

FIG. 3 is a section taken along line III—III of FIG. 2;

FIG. 4 is a section taken along line IV-IV of FIG. 3;

FIG. 5 is a side view of another emodiment of the pneumatically powered hand tool according to the present invention;

FIG. 6 is a large-scale axial section through the rear end of the tool shown in FIG. 5;

FIGS. 7 and 8 are large-scale detail views taken according to the line VII—VII of FIG. 6 showing the bypass valve in its two positions; and FIGS. 9 and 10 are views corresponding to FIGS. 7 and 8 illustrating another type of bypass valve in accordance with this invention.

SPECIFIC DESCRIPTION OF PREFERRED EMBODIMENTS

The embodiment shown in FIGS. 1 – 4 has a metal housing 1 formed with a pistol grip 2 on the lower end of which is provided a compressed gas inlet 2'. The housing 1 has a front portion 3 in which is journaled a spindle 4 carrying tool holder 5, here a Jacobs chuck. The front portion 3 is provided with gearing of the planetary type. More particularly the spindle 4 is connected to a planet carrier 51 whose planet gears 52 mesh with a sun gear 53 formed on another planet carrier 54 and with the housing 3. The second planet carrier 54 has planet gears 55 which mesh externally with the housing section 3 and internally with another sun gear 56 connected to a pneumatically powered turbine 1'. The entire device is meant to operate the chuck 5 by rotating it about the central axis A of the upper part of the housing 1.

On the rear end of the turbine 1' there is provided a rearwardly extending shaft 18 on which is carried a governor 1" constituted as a sleeve 17 axially slidable against the force of a spring 58. A pair of centrifugally outwardly swingable pawls 9 can push the sleeve 17 backwardly into a valve seat 60 (see FIG. 4). In order for the motor 1' to operate compressed gas must be fed to a chamber 61 surrounding the governor 1".

The gas inlet 2' is connected via passages 5' with a pair of chambers 62 and 63 at the back of the housing 1. In these chambers 62 and 63 there are provided balls 10 and 11 resting on seats 15 and 19 and urged against the seats by respective springs 13 and 14. The valve ball 10 can allow passage of compressed gas from the constantly pressurized inlet conduit 5' to a conduit 16 that leads to the valve seat 60 and past this valve seat 60 to the chamber 61. The other valve ball 11 covers a passage 20 which leads directly to the chamber 61.

Provided on the pistol grip handle 2 of the housing 1 is a rockable trigger 6 pivoted on a central axle 7 and connected to either side of this axle through rods 8 and 9 to the valve balls 10 and 11. Thus, depression of the lower portion of the trigger 6 will push the valve 10 off its seats 15 by means of the rod 8 and depression of the upper portion of the trigger 6 will push the valve ball 11 off its seat 19 by means of the rod 9. Under normal circumstances the trigger 6 remains in the central illustrated position, as the springs 13 and 14 act on the balls 10 and 11 and rods 8 and 9 to maintain this central position. In the central position no air can flow into the chamber 61 in any manner and the motor 1' will not be operated to rotate the chuck 5 about the axis A.

When the lower part of trigger 6 is depressed the rod 8 will push the ball 10 off its seat and allow air to flow through the passage 16 to the governor valve 17. The motor 1' will start to rotate and when it achieves a predetermined maximum speed the pawls 59 will swing outwardly so as to bring the end of the sleeve 17 against the seat 60, thereby preventing further speeding up of the motor. The motor will maintain its operation at or below the predetermined speed at which the pawls 59 press the element 17 against the seat 60 so that this speed cannot be exceeded.

Should it be desired to operate at a higher speed the upper portion of the trigger 6 is depressed so that the rod 9 pushes the ball 11 off its seat 19, feeding compressed air through the passage 20 past the governor speed-control valve 17 to the turbine 1'. Thus even though the turbine 1' may rotate at such high speed as to push the sleeve 17 into the seat 60, air continues to flow into the chamber 61 so that this turbine 1' can operate at maximum speed.

In the drill shown in FIGS. 5 - 8 the housing 21 is provided with a synthetic-resin covering 21' and is of generally cylindrical shape so that the housing itself is held by the user. This housing is provided internally with pneumatic motor 22 having at one end a governor 23 as described with references to FIGS. 1 - 4 and connected at the other end through a transmission housing 24 encasing a two-stage planetary-gear transmission 25 to a tool spindle 26 carrying a Jacobs chuck 27. At its rear end the housing 21 has a valve housing with a front part 28 and a rear part 29. A compressed-air inlet 30 is provided on the rear part 29 along with a lug 31 on which a handle 33 is pivoted about an axis 32.

In the rear portion 29 there is a chamber 34 open to the inlet 30 and pressurizable with gas therethrough. A ball 36 is urged by a spring 35 against a seat 37 and constitutes the main control valves of this apparatus. On the other side of this valve is a passage 38 that extends to the interior of its sleeve 39 which in turn opens at its other side into a bypass passage 42 and a passage 41 leading to the governor 23. A slider 40 is displaceable transverse to the axis of the housing 21 in the sleeve 39. This slider 40 has a throughgoing hole 43 and is pressed by means of a spring 40' into a position normally only connecting the passages 38 and 41 so that the bypass conduit 42 is closed off.

The valve ball 36 may be displaced away from the seat 37 by means of an extension 46 on the end of the pin 44 that is pressed outwardly against a lever 33 by means of a spring 45. Thus depression of the end of the lever 33 remote from the pivot 32 will move the pin 44 in to push the ball 36 off its seat and allow air to flow from the inlet chmber 34 into the passage 38.

The sleeve 49 is formed at its outer end 38' with a cylindrical recess 47 in which is received a button pin 40" having at one side a recess 48 in which a transverse pin 49 fixed in the sleeve 38 is provided. In addition this pin 40" is formed with a circumferential groove 50. Thus it is possible when the slider 40 is pressed in as shown in FIG. 8 to rotate the pin 40"so as to engage the transverse pin 49 in the groove 50 and thereby lock the slider 40 in this position shown in FIG. 8.

In the position shown in FIG. 7 the passage 43 through the slider 40 only connects the passages 38 and 41 together. In the position of FIG. 8, however, the passage 38 is connected to both the passages 41 and 42. Thus the governor 23 is bypassed in the position of FIG. 8 so that the motor 22 may run at maximum speed.

The arrangement shown in FIGS. 9 and 10 is identical in all respects with that of FIGS. 7 and 8, except that here a slider 140 replaces the slider 40 and is provided with a passage 151 which connects the passage 38 either to the passage 41 or the passage 42, but not to both of these passages.

It will be understood that each of the elements described above, or two or more together, may also find a useful application in other types of apparatus differing from the types described above.

While the invention has been illustrated and described as embodied in a hand tool, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pneumatic hand tool comprising:
a housing having a compressed-gas inlet;
a pneumatically powered motor in said housing;
a tool holder on said housing connected to said motor;
a governor in said housing connected to said motor;

a normally open speed-control valve in said housing closable by said governor only on said motor reaching a predetermined speed;

means including one gas passage extending between said gas inlet and said governor for feeding compressed gas to said motor through said speed-control valve, whereby said motor is operated at or below said predetermined speed;

means including another gas passage extending between said inlet and said motor around said speed-control valve and a bypass valve in said other passage displaceable between an open position for feeding compressed gas directly to said motor and thereby operating same at a speed greater than said predetermined speed and a closed position wherein said motor can operate no faster than said predetermined speed; and an operating member on said housing displaceable by the user of said tool and engageable with said bypass valve for displacing same into said open position.

2. A pneumatic hand tool comprising:
a housing having a compressed-gas inlet;
a pneumatically powered motor in said housing;
a tool holder on said housing connected to said motor;
a governor in said housing connected to said motor;
a speed-control valve in said housing closable by said governor on said motor reaching a predetermined speed;

means including one gas passage extending between said gas inlet and said governor for feeding compressed gas to said motor through said speed-control valve, whereby said motor is operated at or below said predetermined speed;

means including a normally closed bypass valve and another gas passage extending between said inlet and said motor around said speed-control valve for feeding compressed gas directly to said motor, whereby said speed-control valve and said motor can operate at greater than said predetermined speed;

a normally closed slow valve in said one passage; and an operating member displaceable in one direction to open said bypass valve and in another direction to open said slow valve.

3. The tool defined in claim 2 wherein said housing has a pistol grip provided with a trigger constituting said operating member.

4. The tool defined in claim 2 wherein each of said bypass and slow valves is formed as a valve seat, a ball resting in said seat, and a spring urging said ball into said seat.

5. The tool defined in claim 1, further comprising a main valve between said inlet and both of said passages, said bypass valve being connected between said one passage and said other passage.

6. The tool defined in claim 5 wherein said bypass valve is a slide valve.

7. A pneumatic hand tool comprising:
a housing having a compressed-gas inlet;
a pneumatically powered motor in said housing;
a tool holder on said housing connected to said motor;
a governor in said housing connected to said motor;
a speed-control valve in said housing closable by said governor on said motor reaching a predetermined speed;

means including one gas passage extending between said gas inlet and said governor for feeding compressed gas to said motor through said speed-control valve whereby said motor is operated at or below said predetermined speed;

means including another gas passage extending between said inlet and said motor around said speed-control valve and a slide-type bypass valve connected between said passages and movable between a slow position connecting said inlet exclusively with said one passage and a fast position connecting said inlet exclusively with said other passage for feeding compressed gas directly to said motor, whereby said speed-control valve is bypassed and said motor can operate at greater than said predetermined speed; and a main valve between said inlet and both of said passages.

8. The tool defined in claim 1 wherein said bypass valve is movable between a slow position connecting said inlet exclusively with said one passage and a fast position connecting said inlet with both of said passages.

9. The tool defined in claim 1, further comprising a spring normally urging said bypass valve into a closed condition with gas flowing through said speed-control valve.

10. A pneumatic hand-tool comprising:
a housing having a compressed-gas inlet;
a pneumatically powered motor in said housing;
a tool holder on said housing connected to said motor;
a governor in said housing connected to said motor;
a speed-control valve in said housing closable by said governor on said motor reaching a predetermined speed;

means including one gas passage extending between said gas inlet and said governor for feeding compressed gas to said motor through said speed-control valve, whereby said motor is operated at or below said predetermined speed;

means including another gas passage extending between said inlet and said motor around said feed-control valve and a slide-type bypass valve connected between said passages for feeding compressed gas directly to said motor, whereby said speed-control valve is bypassed and said motor can operate at greater than said predetermined speed;

a main valve between said inlet and both of said passages;

a spring normally urging said bypass valve into a closed condition with gas flowing through said speed-control valve; and means for locking said bypass valve in an open condition.

* * * * *